United States Patent
Edelman

(10) Patent No.: US 6,169,334 B1
(45) Date of Patent: Jan. 2, 2001

(54) COMMAND AND CONTROL SYSTEM AND METHOD FOR MULTIPLE TURBOGENERATORS

(75) Inventor: Edward C. Edelman, Agoura Hills, CA (US)

(73) Assignee: Capstone Turbine Corporation, Chatsworth, CA (US)

( * ) Notice: Under 35 U.S.C. 154(b), the term of this patent shall be extended for 0 days.

(21) Appl. No.: 09/181,389

(22) Filed: Oct. 27, 1998

(51) Int. Cl.$^7$ .................................................. F01D 15/10
(52) U.S. Cl. .............................. 290/52; 290/40; 290/46; 290/52; 318/140
(58) Field of Search .................................. 290/40, 46, 42, 290/52; 318/140

(56) References Cited

U.S. PATENT DOCUMENTS

| | | |
|---|---|---|
| 2,163,140 | 6/1939 | Coleman et al. ............... 290/40 R |
| 3,651,331 | 3/1972 | Raeber ............................... 290/40 R |
| 3,703,663 | 11/1972 | Wagner .................................. 290/52 |
| 4,069,424 | 1/1978 | Burkett ................................ 290/40 A |
| 4,164,661 | 8/1979 | Hucker et al. ........................ 307/57 |
| 4,195,231 | 3/1980 | Reed et al. ........................ 290/40 R |
| 4,245,163 | 1/1981 | Philippe ............................... 290/52 |
| 4,467,216 | 8/1984 | Murphy ................................ 290/43 |
| 4,605,129 | 8/1986 | Yannone et al. ................... 290/40 R |

Primary Examiner—Elvin Enad
(74) Attorney, Agent, or Firm—Albert J. Miller

(57) ABSTRACT

A command and control system and method for multiple turbogenerators in a grid parallel system includes a master controller to start, sequence, coordinate power commands, and provide fault handling to each of the individual turbogenerators and the specific control modes. A bi-directional power meter, that measures the load consumption (or production when a turbogenerator system is installed) in a building or application, may also be utilized. This power meter can provide a reference or setpoint to the master controller for controlling the individual turbogenerators.

23 Claims, 4 Drawing Sheets

COMMAND AND CONTROL SYSTEM AND METHOD FOR MULTIPLE TURBOGENERATORS

TECHNICAL FIELD

This invention relates to the general field of turbogenerator controls, and more particularly, to a command and control system and method for multiple turbogenerators in a grid parallel system.

BACKGROUND OF THE INVENTION

A turbogenerator/motor can be utilized to provide electrical power for a wide range of utility, commercial and industrial applications. Since an individual turbogenerator/motor may only generate 24 to 50 kilowatts, there are, however, many industrial and commercial applications that require more power than is available from a single turbogenerator/motor. Powerplants of up to 500 kilowatts or even greater are possible by linking numerous turbogenerator/motors together. In any such application, multiple turbogenerators can be controlled and operated to provide total power (load following) or partial power (peak shaving or base loading).

There are two primary modes of operation for the multiple turbogenerator/motors linked together (commonly referred to as a Multi-Pac)—stand alone, where the turbogenerator system provides total power to a commercial or industrial application, and grid parallel, where the Multi-Pac synchronizes power to the utility grid and supplements power to the grid. The present invention is directed to a grid parallel system.

In the case of a grid parallel system, there are utility restrictions or variable rate schedules that govern the operation of the turbogenerator system. To maximize the economic feasibility of the turbogenerator, the system can be operated in the following control modes depending on the specific application and rate schedules—(1) load following, where the total power consumption in a building or application is measured by a power meter, and the turbogenerator system equalizes or meets the demand, (2) peak shaving, where the total power consumption in a building or application is measured by a power meter, and the turbogenerator system reduces the utility consumption to a fixed load, thereby reducing the utility rate schedule and increasing the overall economic return of the turbogenerator, and (3) base load, where the turbogenerator system provides a fixed load and the utility supplements the load in a building or application. Each of these control modes require different control strategies to optimize the total operating efficiency, and all are addressed in the present invention.

SUMMARY OF THE INVENTION

When controlling multiple turbogenerator systems, a master controller is required to start, sequence, coordinate power commands, and provide fault handling to each of the individual turbogenerators. The specific control modes for the master controller are identified in this invention.

In most applications, a power meter that measures the load consumption (or production when a turbogenerator system is installed) in a building or application is also required. This power meter provides a reference or setpoint to the master controller for controlling the individual turbogenerators. If a building or application requires power, the master controller sequences the appropriate number of turbogenerators to meet the demand (or in the case of peak shaving, meet a user defined setpoint).

It is, therefore, the principal aspect of the present invention to provide a system and method to control the operation of multiple turbogenerators and associated electronic inverters.

It is another aspect of the present invention to provide a control system and method to control the flow of fuel into the individual combustors of the multiple turbogenerators.

It is another aspect of the present invention to provide a control system and method to control the temperature of the combustion process in the individual combustors of the multiple turbogenerators and the resulting turbine inlet and turbine exhaust temperatures.

It is another aspect of the present invention to provide a control system and method to control the rotational speed of the individual rotors of the multiple turbogenerators, upon which the centrifugal compressor wheels, the turbine wheels, the motor/generators, and the bearings are mounted.

It is another aspect of the present invention to provide a control system and method to control the torque produced by the individual power heads (turbine and compressor wheel mounted and supported by bearings on a common shaft) of the multiple turbogenerators and delivered to the motor/generators of the turbogenerators.

It is another aspect of the present invention to provide a control system and method to control the shaft power produced by the individual motor/generators of the multiple turbogenerators.

It is another aspect of the present invention to provide a control system and method to control the operation of the low frequency inverters which uses power from the direct current bus of the turbogenerator controllers to generate low frequency, three phase power.

It is another aspect of the present invention to provide a master control system to control the operation of two or more turbogenerators as a single system.

It is another aspect of the present invention to provide a master control system to maximize the overall efficiency of two or more turbogenerators in a single system.

It is another aspect of the present invention to provide a master control system to provide multiple modes of operation—load following, utility peak shaving, and base load, to optimize the economic investment return of the turbogenerator system.

It is another aspect of the present invention to provide a master control system to prevent repeated starting and stopping of the individual turbogenerator units by hysteresis bands, rate limiting and setpoint integration.

It is another aspect of the present invention to provide a master control system to reduce power transients of the individual turbogenerator units by rate limiting and setpoint integration.

It is another aspect of the present invention to provide a master control system to provide a fault tolerant system by responding to turbogenerator faults by dispatching other turbogenerators in the Multi-Pac.

It is another aspect of the present invention to provide a master control system that limits the start attempts of a failed turbogenerator system with a fault counter.

It is another aspect of the present invention to provide a master control system that balances the run time of each turbogenerator in the Multi-Pac, thereby extending the life of the total package.

It is another aspect of the present invention to provide a master control system that optimizes the transient response by running turbogenerators in idle or standby state.

BRIEF DESCRIPTION OF THE DRAWINGS

Figure 1:
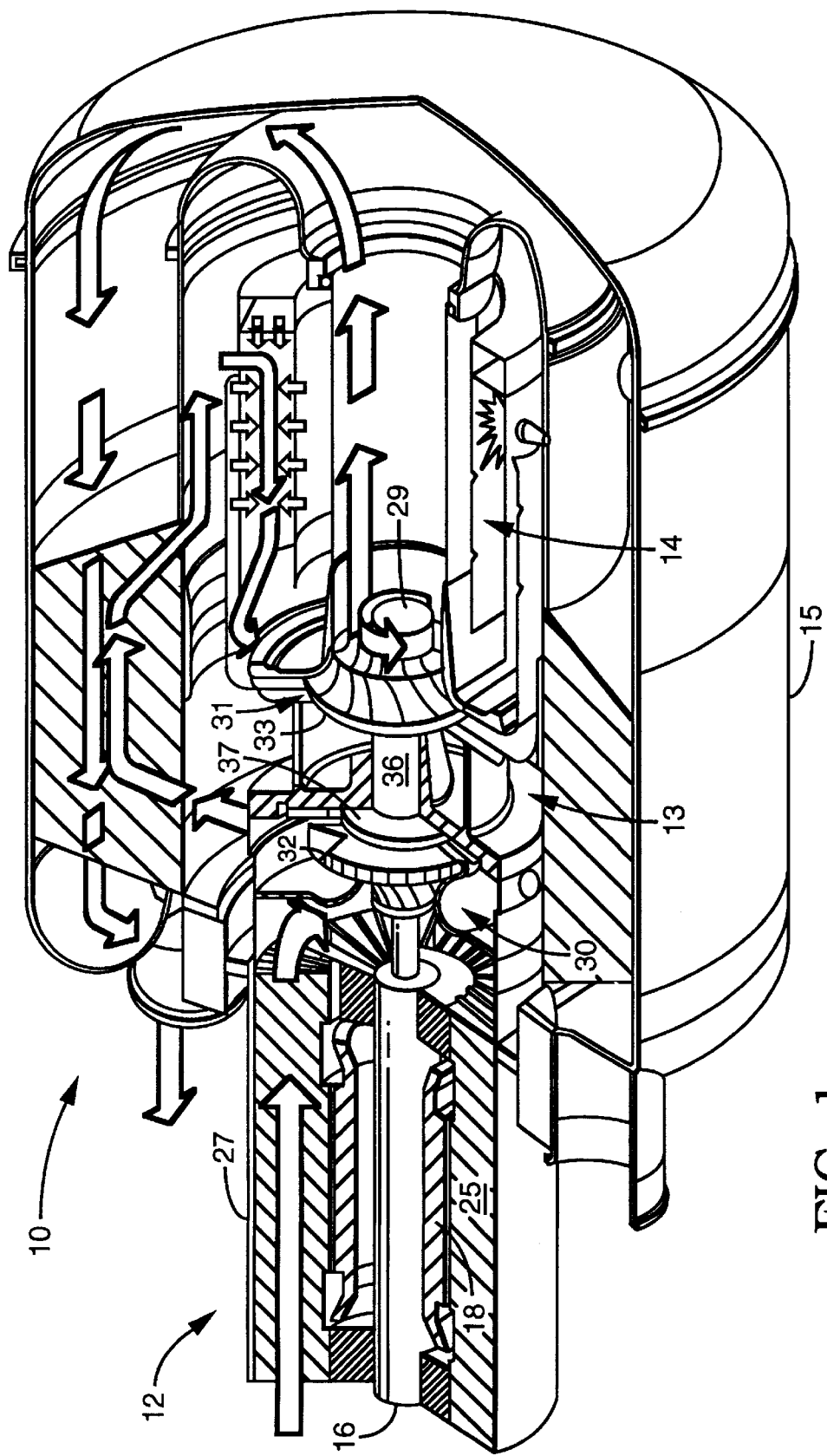
Figure 2:
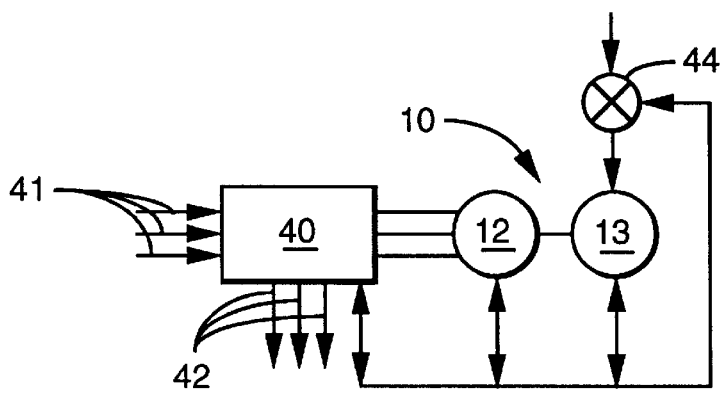
Figure 3:
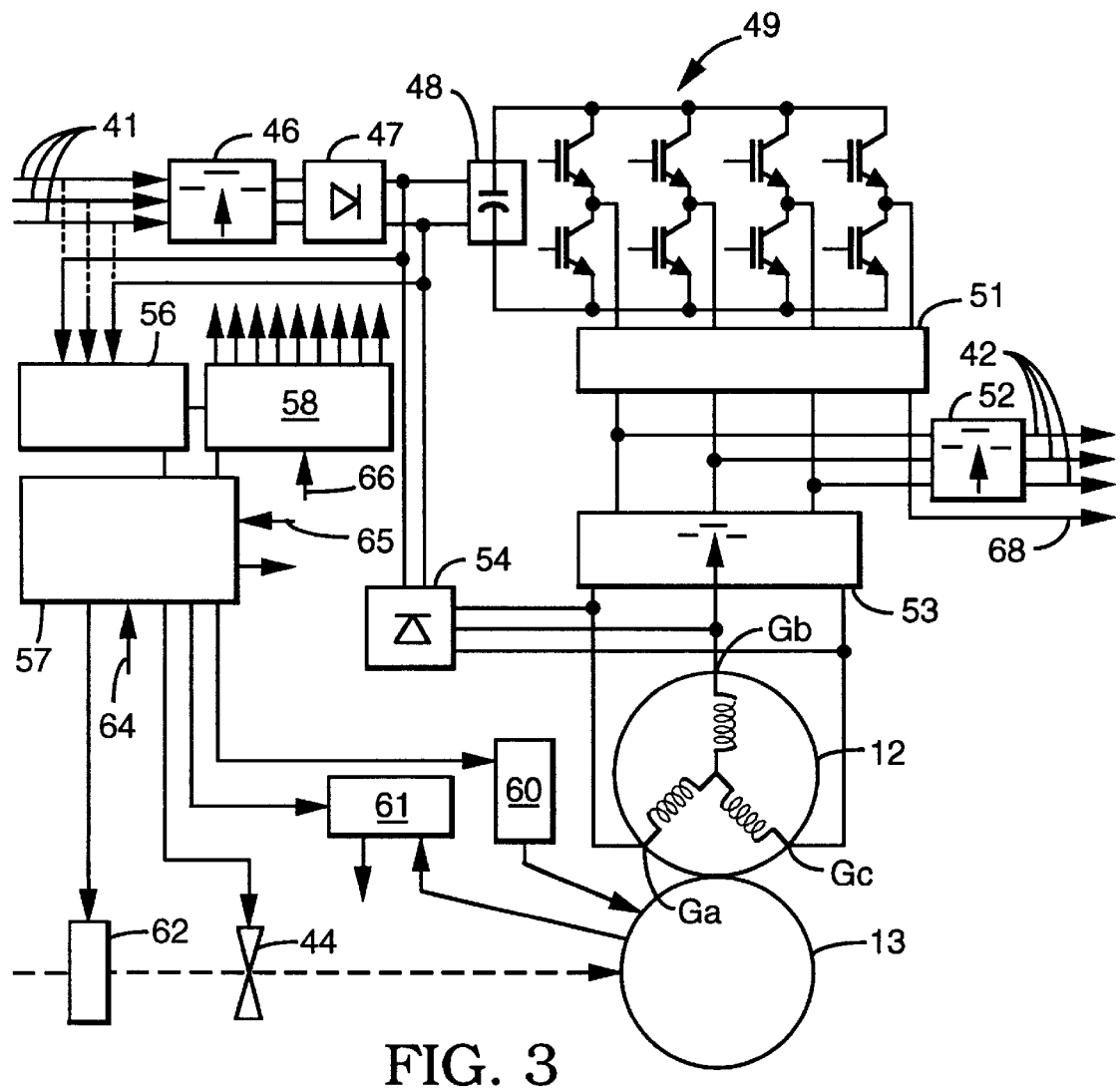
Figure 4:
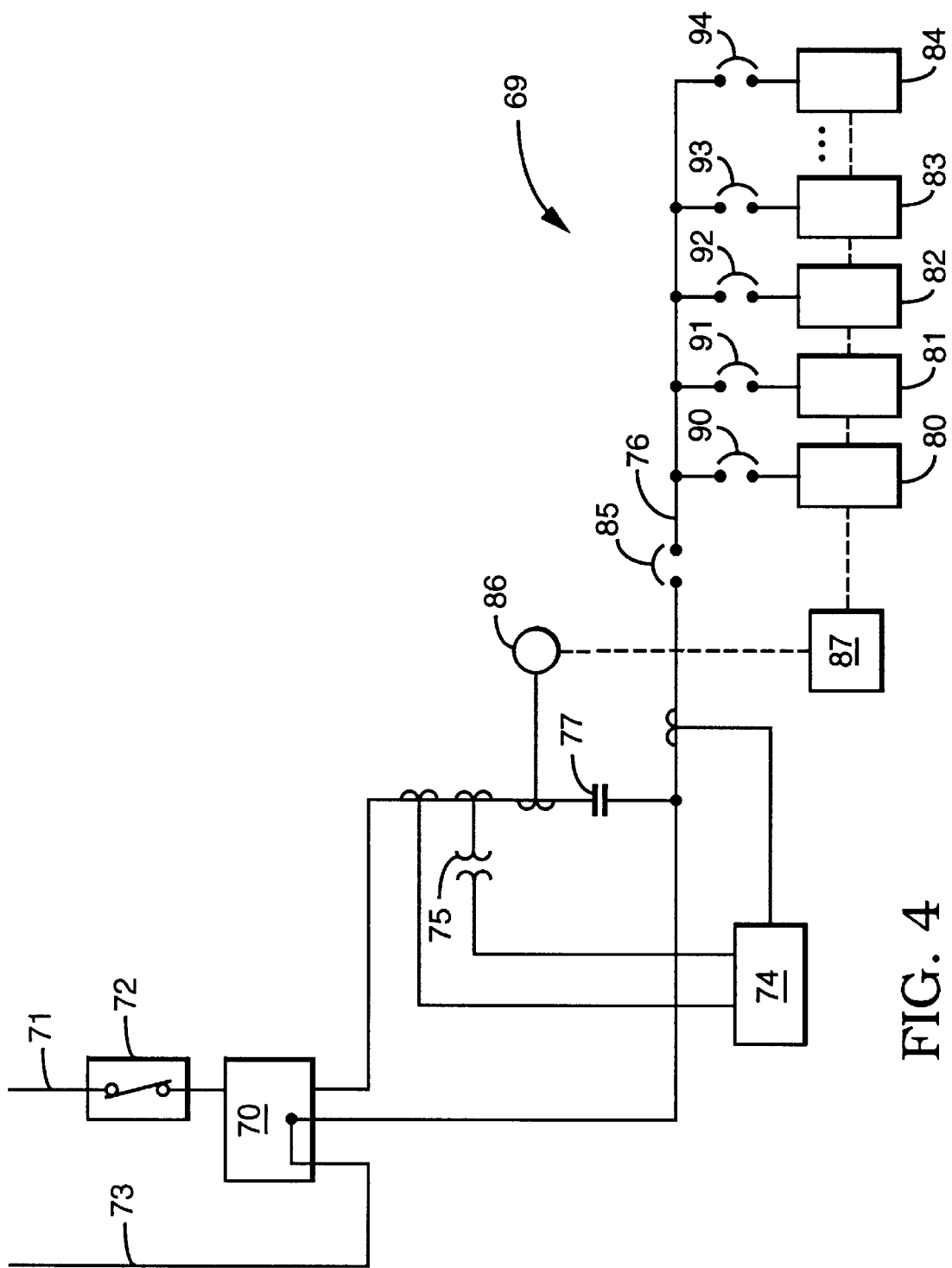
Figure 5:
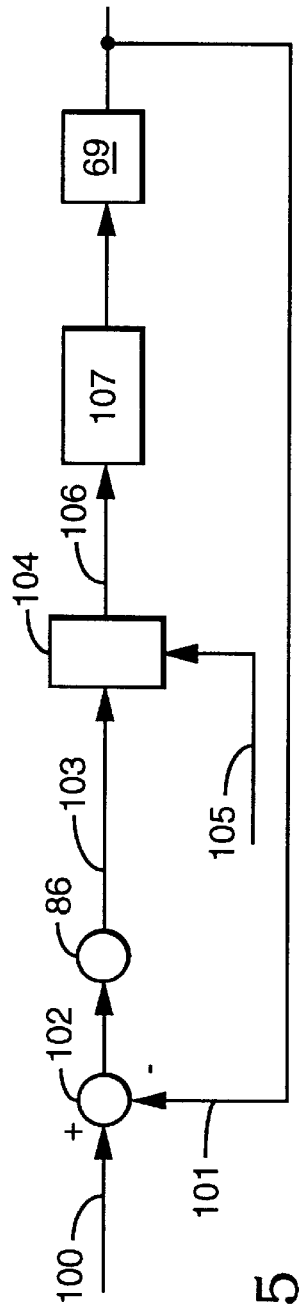
Figure 6:
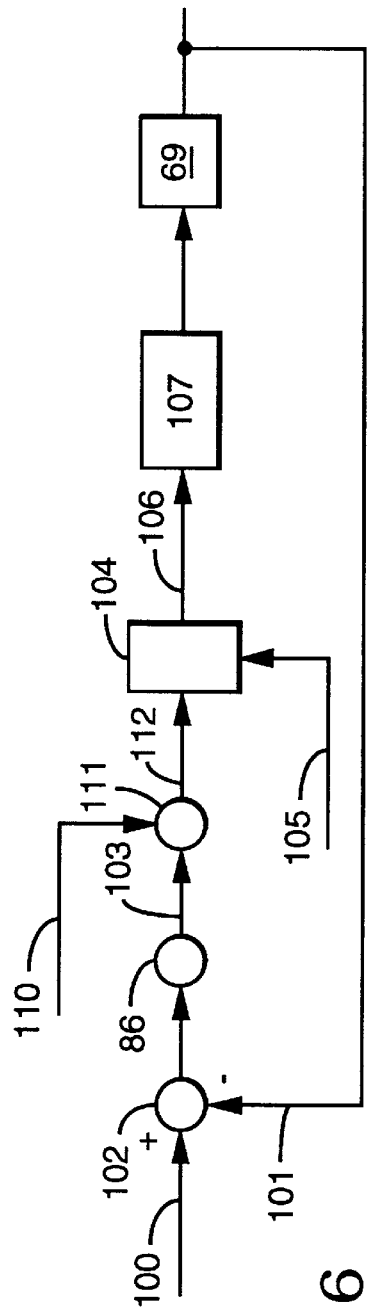
Figure 7:
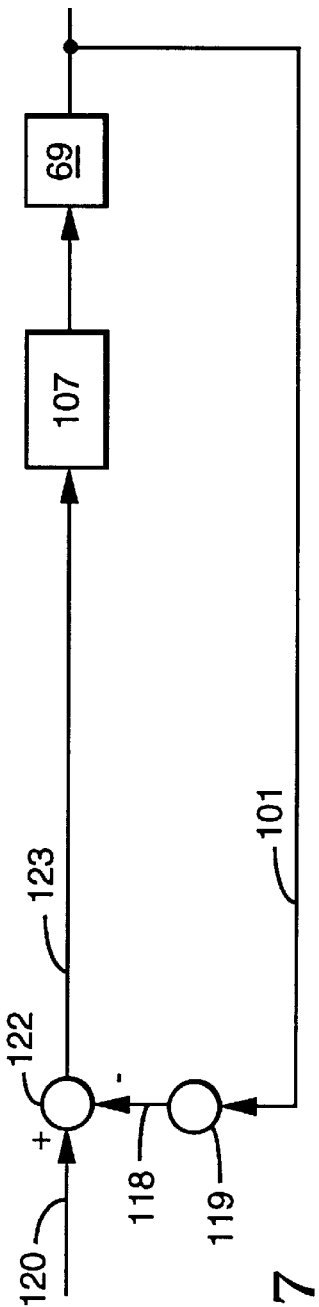

Having thus described the present invention in general terms, reference will now be made to the accompanying drawings in which:

FIG. 1 is a perspective view, partially cut away, of a permanent magnet turbogenerator/motor for use with the power control system of the present invention;

FIG. 2 is a functional block diagram of the interface between the generator controller and the permanent magnet turbogenerator/motor illustrated in FIG. 1;

FIG. 3 a functional block diagram of the permanent magnet turbogenerator/motor controller of FIG. 2;

FIG. 4 is a block diagram of a typical Multi-Pac installation;

FIG. 5 is a block diagram of the utility load following control mode for the grid parallel Multi-Pac system;

FIG. 6 is a block diagram of the utility base load or peak shaving control mode for the grid parallel Multi-Pac system; and FIG. 7 is a block diagram of the base load control mode for the grid parallel Multi-Pac system.

DETAILED DESCRIPTION OF THE PREFERRED EMBODIMENTS

A permanent magnet turbogenerator/motor 10 is illustrated in FIG. 1 as an example of a turbogenerator/motor utilizing the controller of the present invention. The permanent magnet turbogenerator/motor 10 generally comprises a permanent magnet generator 12, a power head 13, a combustor 14 and a recuperator (or heat exchanger) 15.

The permanent magnet generator 12 includes a permanent magnet rotor or sleeve 16, having a permanent magnet disposed therein, rotatably supported within a permanent magnet generator stator 18 by a pair of spaced journal bearings. Radial permanent magnet stator cooling fins 25 are enclosed in an outer cylindrical sleeve 27 to form an annular air flow passage which cools the stator 18 and thereby preheats the air passing through on its way to the power head 13

The power head 13 of the permanent magnet turbogenerator/motor 10 includes compressor 30, turbine 31, and bearing rotor 36 through which the tie rod 29 passes. The compressor 30, having compressor impeller or wheel 32 which receives preheated air from the annular air flow passage in cylindrical sleeve 27 around the permanent magnet stator 18, is driven by the turbine 31 having turbine wheel 33 which receives heated exhaust gases from the combustor 14 supplied with air from recuperator 15. The compressor wheel 32 and turbine wheel 33 are rotatably supported by bearing shaft or rotor 36 having radially extending bearing rotor thrust disk 37. The bearing rotor 36 is rotatably supported by a single journal bearing within the center bearing housing while the bearing rotor thrust disk 37 at the compressor end of the bearing rotor 36 is rotatably supported by a bilateral thrust bearing. The bearing rotor thrust disk 37 is adjacent to the thrust face at the compressor end of the center bearing housing while a bearing thrust plate is disposed on the opposite side of the bearing rotor thrust disk 37 relative to the center housing thrust face.

Intake air is drawn through the permanent magnet generator 12 by the compressor 30 which increases the pressure of the air and forces it into the recuperator 15. In the recuperator 15, exhaust heat from the turbine 31 is used to preheat the air before it enters the combustor 14 where the preheated air is mixed with fuel and burned. The combustion gases are then expanded in the turbine 31 which drives the compressor 30 and the permanent magnet rotor 16 of the permanent magnet generator 12 which is mounted on the same shaft as the turbine 31. The expanded turbine exhaust gases are then passed through the recuperator 15 before being discharged from the turbogenerator/motor 10.

A functional block diagram of the interface between the generator controller 40 and the permanent magnet turbogenerator/motor 10 for stand alone operation is illustrated in FIG. 2. The generator controller 40 receives power 41 from a source such as a utility to operate the permanent magnet generator 12 as a motor to start the turbine 31 of the power head 13. During the start sequence, the utility power 41 is rectified and a controlled frequency ramp is supplied to the permanent magnet generator 12 which accelerates the permanent magnet rotor 16 and the compressor wheel 32, bearing rotor 36 and turbine wheel 33. This acceleration provides an air cushion for the air bearings and airflow for the combustion process. At about 12,000 rpm, spark and fuel are provided and the generator controller 40 assists acceleration of the turbogenerator 10 up to about 40,000 rpm to complete the start sequence. The fuel control valve 44 is also regulated by the generator controller 40.

Once self sustained operation is achieved, the generator controller 40 is reconfigured to produce 60 hertz, three phase AC (208 volts) 42 from the rectified high frequency AC output (280–380 volts) of the high speed permanent magnet turbogenerator 10. The permanent magnet turbogenerator 10 is commanded to a power set-point with speed varying as a function of the desired output power. For grid connect applications, output 42 is connected to input 41, and these terminals are then the single grid connection.

The functional blocks internal to the generator controller 40 are illustrated in FIG. 3. The generator controller 40 includes in series the start power contactor 46, rectifier 47, DC bus capacitors 48, pulse width modulated (PWM) inverter 49, AC output filter 51, output contactor 52, generator contactor 53, and permanent magnet generator 12. The generator rectifier 54 is connected from between the rectifier 47 and bus capacitors 48 to between the generator contactor 53 and permanent magnet generator 12. The AC power output 42 is taken from the output contactor 52 while the neutral is taken from the AC filter 51.

The control logic section consists of control power supply 56, control logic 57, and solid state switched gate drives illustrated as integrated gate bipolar transistor (IGBT) gate drives 58, but may be any high speed solid state switching device. The control logic 57 receives a temperature signal 64 and a current signal 65 while the IGBT gate drives 58 receive a voltage signal 66. The control logic 57 sends control signals to the fuel cutoff solenoid 62, the fuel control valve 44, the ignitor 60 and release valve 61. AC power 41 is provided to both the start power contactor 46 and in some instances directly to the control power supply 56 in the control logic section of the generator controller 40 as shown in dashed lines.

Utility start power 41, (for example, 208 AC voltage, 3 phase, 60 hertz), is connected to the start power contactor 46 through fuses (not shown). The start power contactor 46 may consist of a first normally open relay and a second normally closed relay, both of which are de-energized at start up. Alternately, both relays may be normally open and the control power supply 56 receives input directly from utility power input 41. Flameproof power resistors can parallel the relays to provide a reduced current (approximately 10 amps maximum) to slowly charge the internal bus capacitors 48 through the rectifier 47 to avoid drawing excessive inrush current from the utility.

Once the bus capacitors 48 are substantially charged, (to approximately 180 VDC, or 80% of nominal), the control power supply 56 starts to provide low voltage logic levels to the control logic 57. Once the control logic microprocessor has completed self tests, coil power is provided to first normally open relay of the start power contactor 46 to fully charge the bus capacitors 48 to full peak line voltage. The bus capacitors 48 can be supplemented for high frequency filtering by additional film type (dry) capacitors.

The PWM inverter 49 operates in two basic modes: a variable voltage (0–190 V line to line), variable frequency (0–700 hertz) constant volts per hertz, three phase mode to drive the permanent magnet generator/motor 12 for start up or cool down when the generator contactor 52 is closed; or a constant voltage (120 V line to neutral per phase), constant frequency three phase 60 hertz mode. The control logic 57 and IGBT gate drives receive feedback via current signal 65 and voltage signal 66, respectively, as the turbine generator is ramped up in speed to complete the start sequence. The PWM inverter 49 is then reconfigured to provide 60 hertz power, either as a current source for grid connect, or as a voltage source.

The generator contactor 53 connects the permanent magnet generator 12 to the inverter 49 during the start sequence. Initial starting current approximates nominal operating current for about 2 seconds then reduces to a lower value for the balance of the acceleration period. After the start sequence is completed, the generator 12 produces enough output voltage at the output terminals of the generator rectifier 54 to provide three phase regulated output from the inverter 49, so both the start contactor 46 and generator contractor are opened and the system is then self sustaining.

During startup of the permanent magnet turbogenerator/motor 10, both the start power contactor 46 and the generator contactor 53 are closed and the output contactor 52 is open. Once self sustained operation is achieved, the start power contactor 46 and the generator contactor 53 are opened and the PWM inverter 49 is reconfigured to a controlled 60 hertz mode. After the reconfiguration of the PWM inverter 49, the output contactor 52 is closed to connect the AC output 42. The start power contactor 46 and generator contactor 53 will remain open.

The PWM inverter 49 is truly a dual function inverter which is used both to start the permanent magnet turbogenerator/motor 10 and is also used to convert the permanent magnet turbogenerator/motor output to utility power, either sixty hertz, three phase for stand alone applications, or as a current source device. With start power contactor 46 closed, single or three phase utility power is brought through the start power contactor 46 to be able to operate into a bridge rectifier 47 and provide precharged power and then start voltage to the bus capacitors 48 associated with the PWM inverter 49. This allows the PWM inverter 49 to function as a conventional adjustable speed drive motor starter to ramp the permanent magnet turbogenerator/motor 10 up to a speed sufficient to start the gas turbine 31.

An additional rectifier 54, which operates from the output of the permanent magnet turbogenerator/motor 10, accepts the three phase, up to 380 volt AC from the permanent magnet generator/motor 12 which at full speed is 1600 hertz and is classified as a fast recovery diode rectifier bridge. Six diode elements arranged in a classic bridge configuration comprise this high frequency rectifier 54 which provides output power at DC. The rectified voltage is as high as 550 volts under no load.

The permanent magnet turbogenerator/motor 10 is basically started at zero frequency and rapidly ramps up to approximately 12,000 rpm. This is a two pole permanent magnet generator/motor 12 and as a result 96,000 rpm equals 1,600 hertz. Therefore 12,000 rpm is ⅛th of that or 200 hertz. It is operated on a constant volt per hertz ramp, in other words, the voltage that appears at the output terminals is ⅛th of the voltage that appears at the output terminals under full speed.

Approximate full speed voltage is 380 volts line to line so it would be approximately ⅛th of that. When the PWM inverter 49 has brought the permanent magnet turbogenerator/motor 10 up to speed, the fuel solenoid 62, fuel control valve 44 and ignitor 60 cooperate to allow the combustion process to begin. Using again the adjustable speed drive portion capability of the PWM inverter 49, the permanent magnet turbogenerator/motor 10 is then accelerated to approximately 35,000 or 40,000 rpm at which speed the gas turbine 31 is capable of self sustaining operation.

The reconfiguration or conversion of the PWM inverter 49 to be able to operate as a current source synchronous with the utility grid is accomplished by first stopping the PWM inverter 49. The AC output or the grid connect point is monitored with a separate set of logic monitoring to bring the PWM inverter 49 up in a synchronized fashion. The generator contactor 53 functions to close and connect only when the PWM inverter 49 needs to power the permanent magnet turbogenerator/motor 10 which is during the start operation and during the cool down operation. The output contactor 52 is only enabled to connect the PWM inverter 49 to the grid once the PWM inverter 49 has synchronized with grid voltage.

The implementation of the control power supply 56 first drops the control power supply 56 down to a 24 volt regulated section to allow an interface with a battery or other control power device. The control power supply 56 provides the conventional logic voltages to both the IGBT gate drives 58 and control logic 57. The IGBT gate drives have two isolated low voltage sources to provide power to each of the two individual IGBT drives and the interface to the IGBT transistors is via a commercially packaged chip.

This system is also capable of generating 480 volt output directly. By changing the winding in the permanent magnet generator/motor 12, the voltage ratings of the IGBTs, and the bus capacitors 48, the system is then capable of operating directly at 480 volts, starting from grid voltage with 480 volts, and powering directly to 480 volts without requiring a transformer.

A further description of this turbogenerator/motor control system is provided in U.S. patent application Ser. No. 924,966, filed Sep. 8, 1997 by Everett R. Geis and Brian W. Peticolas entitled Turbogenerator/Motor Controller assigned to the same assignee as this application and incorporated herein by reference.

FIG. 4 shows a typical installation for a Multi-Pac system 69. A common junction box 70 connects the Multi-Pac to utility grid 71 through disconnect switch 72 and to the building load 73. A timed protector 74 including relay 75 is connected to the common junction box 70 and is also connected to the system bus 76 through capacitor 77. This provides a timed disconnect between the Multi-Pac and the utility in the event the Multi-Pac back feeds the utility grid for a specified period of time. A digital power meter 86 is connected between relay 75 and capacitor 77.

The individual turbogenerator power controllers/inverters 80, 81, 82, 83, and 84 are connected directly to the system bus 76 through contactors 90, 91, 92, 93, and 94 respectively, using the grid frequency and voltage as a reference. Contactor 85 serves to disconnect the turbogenerator power controllers/inverters 80, 81, 82, 83, and 84 from the rest of the system. Master controller 87 digitally communicates to each of the turbogenerator power controllers/inverters 80, 81, 82, 83, and 84 and to the digital power meter 86.

A total of five (5) individual turbogenerator power controllers/inverters 80, 81, 82, 83, and 84 are shown for illustration purposes. Turbogenerator power controller/inverter 80 can be designated turbogenerator number 1, turbogenerator power controller/inverter 81 can be designated turbogenerator number 2, turbogenerator power controller/inverter 82 can be designated turbogenerator number 3, turbogenerator power controller/inverter 83 can be designated turbogenerator number 4, while turbogenerator power controller/inverter 84 can be designated turbogenerator number "n", with "n" being any whole number five (5) or greater.

FIGS. 5, 6, and 7 are block diagrams of the three primary control modes for grid parallel Multi-Pac system, namely utility load following control mode, utility base load or peak shaving control mode, and base load control mode, respectively.

In the utility load following mode illustrated in FIG. 5, the utility power consumption signal 100 and the Multi-Pac power generation signal 101 are compared in summer or comparator 102 which produces a difference or error signal 103 measured by the digital power meter 86. This error signal 103 is integrated over a user defined specified time in a gain multiplier 104 which also receives an integrator reset timer signal 105. This integrated error signal insures that the total utility consumption over a user-specified time period is negated. The gain multiplier 104 produces a power demand signal 106, which is rate and authority limited, and is fed to the Multi-Pac 69 through a sequencing and control logic system 107.

In the utility base load or peak shaving mode illustrated in FIG. 6, the error signal 103 from the digital power meter 86 is compared to a utility offset signal 110 in comparator 111 to produce an error signal 112 to gain multiplier 104. In all other respects, the utility base load or peak shaving mode is the same as the utility load following mode of FIG. 5.

When operating in the base load mode illustrated in FIG. 7, the total turbogenerator power output 101 is measured by power meter 119 which generates a signal 118 for comparison with a base load demand 120 in comparator 122. The error signal 123 from comparator 122 is integrated over a user defined specified time in gain multiplier 104 which identifies the response rate of the turbogenerator system.

In all modes, the sequencing and control logic system 107 determines the start, stop and loading for each of the individual turbogenerators. The sequencing and control logic system 107 includes a proportional-plus-integral control which regulates the power demand to the individual turbogenerators. This logic is based on turbogenerator availability, fault conditions, power output capability, overall system efficiency, start/stop deadband, rate and authority limits.

To optimize the start sequencing, the master controller 87 identifies the number of turbogenerators to start based on the predicted performance from the previous run cycle and ambient conditions. The start order is based on total run time of each turbogenerator to evenly distribute the total run time of each. Thus, the turbogenerator with the minimum run time starts first and the turbogenerator with the maximum run time shuts down first. The turbogenerator in grid parallel application uses the utility power for starting, motoring and stopping. For a Multi-Pac system, the turbogenerator starts are staggered to minimize the total power draw requirements and fuel supply at a given time. Based on the package size (number of turbogenerators) and installation, the starts can be programmed to minimize the utility demand, battery consumption or fuel supply. To improve reliability, engine restart is automatic in the event of a fault shutdown. Thus if one turbogenerator system faults, another turbogenerator starts to meet the power demand. To prevent repeated starts of a failed turbogenerator system, a maximum number of starts per load cycle can be programmed.

The start availability is also taken into consideration during start sequencing. There is an approximately 15 minute cool down period for the turbogenerator, so as soon as the cool down criteria are met, the turbogenerator is available for restart.

For load following applications, the load is constantly changing, thereby requiring individual turbogenerators to start and stop. For example, an air conditioning unit, which can start and stop several times per hour, can be the single largest consumer of electricity in a building, resulting in excessive start and shutdown cycles for the turbogenerators. To reduce the cycles and increase the overall operating efficiency, control strategies that include power hysterisis bands, rate limits and setpoints integrated over time are implemented in the master control system.

Since the turbogenerator is designed to operate at or near peak efficiency over a wide range of load conditions and engine speeds due to the power inverter, the load output of each turbogenerator is regulated by the master controller to maximize the efficiency of the entire Multi-Pac. When load transients suddenly increase the load, the operating turbogenerators can quickly increase output to maintain the power demand setpoint.

Alternately, all turbogenerators can be operated at maximum output except for the last turbogenerator that was started. The last turbogenerator started can have its power regulated to maintain the power demand setpoint. Care must be used, however, to prevent the regulated turbogenerator from oscillating due to repetitive changes in the power demand.

The master control system includes turbogenerator performance curves for each turbogenerator to determine the peak operating efficiency of the complete Multi-Pac system. Since the turbogenerator and inverter design allows the engine to operate at various speeds while maintaining a fixed low frequency output, each turbogenerator can operate at a different speed to maximize the entire Multi-Pac efficiency.

Automatic load following is a control mode in which the Multi-Pac supplies the entire load and maintains the utility contribution at zero. Load transients in this control mode have a large impact on the output of the total system. Sudden decreases in load cause the system to back feed onto the utility grid for a short time until the Multi-Pac energy can be dissipated. Rapid increases in load require the utility grid to supply power for a short time until the Multi-Pac power output can be met. This constant changing in power demand can greatly reduce the operating efficiency of the entire system. To prevent constant acceleration and deceleration of the engine to meet the changing load demand, the master control system integrates the power consumption and generation of the building or application over time. This integration time period can be programmed to vary based on the utility rate schedule. For example, if the utility rate is based on the peak power consumption over a 15-minute period, the total power consumption can be integrated to meet the building load over that time period. This integrated load following setpoint allows the control system to slow or limit the rate of acceleration or deceleration, and reduce the starting and stopping of individual units, thereby increasing the overall efficiency of the entire system.

If rapid transient response is required, one or more turbogenerators may operate in idle or standby, ready to deliver power at any instance in time. While this control strategy sacrifices efficiency over availability, it does provide better response times to increased loads. To prevent repetitive start and stop sequencing of the turbogenerators as a result of small changes in power demand, an adjustable deadband is provided in the master controller 87.

In the utility base load control mode (or peak shaving mode), the master control system regulates the Multi-Pac output to maintain a constant base load from the utility grid. The operator enters the utility base load setpoint, and the master controller 87 regulates the individual turbogenerators so that the grid provides a constant amount of power regardless of the variations in load.

In the base load control mode, the master control system maintains a fixed power output regardless of the fluctuations in load. Due to changes in ambient operating conditions, individual turbogenerators may start, stop, to meet the constant load demand, and to change power demand.

While specific embodiments of the invention have been illustrated and described, it is to be understood that these are provided by way of example only and that the invention is not to be construed as being limited thereto but only by the proper scope of the following claims.

What I claim is:

1. A command and control system for a plurality of permanent magnet turbogenerators, comprising:
    a plurality of individual permanent magnet turbogenerators, each of said plurality of individual permanent magnet turbogenerators having a controller;
    a command and control system bus, each of said plurality of individual permanent magnet turbogenerator controllers operably connected to said command and control system bus;
    a plurality of disconnect switches, a disconnect switch provided in each operable connection of an individual permanent magnet turbogenerator controller to said command and control bus;
    a bi-directional power meter;
    a master controller operably connected to each of the permanent magnet turbogenerator controllers and with said bi-directional power meter to control the individual permanent magnet turbogenerators in a selected control mode; and
    a junction box operably connecting an electric utility, said power meter, the output of the plurality of individual permanent magnet turbogenerators, and a load.

2. The command and control system of claim 1, and in addition:
    a timed relay operably connected to said command and control system bus, said bi-directional power meter, and said junction box to prevent the feedback of electrical power to the electric utility.

3. The command and control system of claim 1 wherein said selected control mode is a utility load following mode in which utility power consumption and permanent magnet turbogenerator power generation are compared to produce an error signal which is integrated over a defined specified time to produce a power demand signal.

4. The command and control system of claim 1 wherein said selected control mode is a utility base load mode in which a defined utility power signal and the power meter signal are compared to produce an error signal which is integrated over a defined specified time to produce a power demand signal.

5. The command and control system of claim 1 wherein said selected control mode is a base load mode in which the power meter signal and a base load demand signal are compared to produce an error signal which is integrated over a defined specified time to produce a power demand signal.

6. The command and control system of claim 1 wherein said selected control mode includes the starting, shutting down and loading of each of said plurality of individual permanent magnet turbogenerators.

7. The command and control system of claim 6 wherein said starting, shutting down, and loading of said plurality of individual permanent magnet turbogenerators is based on the time of operation of each of said plurality of individual permanent magnet turbogenerators.

8. The command and control system of claim 7 wherein the permanent magnet turbogenerator with the least time of operation is started first.

9. The command and control system of claim 7 wherein the permanent magnet turbogenerator with the most time of operation is shut down first.

10. The command and control system of claim 6 wherein the starting of the permanent magnet turbogenerators is staggered to minimize total power draw requirements.

11. The command and control system of claim 6 wherein a permanent magnet turbogenerator is automatically restarted in the event of a fault shutdown.

12. The command and control system of claim 6 wherein an inactive permanent magnet turbogenerator is automatically restarted in the event of a fault shutdown of an active permanent magnet turbogenerator.

13. The command and control system of claim 1 wherein said master controller includes a sequencing and control logic system.

14. The command and control system of claim 13 wherein said sequencing and control logic system includes a proportional-plus-integrated control to regulate power demand.

15. The command and control system of claim 1 wherein said selected control mode includes power hysterisis bands, rate limits and power setpoints integrated over time.

16. A method of commanding and controlling the operation of a plurality of individual permanent magnet turbogenerators, each with a permanent magnet turbogenerator controller, comprising the steps of:
    connecting each of the plurality of individual permanent magnet turbogenerators to a system bus;
    measuring the production of power from the plurality of permanent magnet turbogenerators with a bi-directional power meter;
    sequencing the operation of the individual permanent magnet turbogenerators with a master controller to meet a power demand; and
    preventing the feedback of electrical power to the electric utility with a timed relay connected to the system bus and the bi-directional power meter.

17. The method of commanding and controlling the operation of a plurality of permanent magnet turbogenerators of claim 16 wherein said sequencing step is to meet a user defined power setpoint.

18. The method of commanding and controlling the operation of a plurality of permanent magnet turbogenerators of claim 16 wherein said sequencing step includes preventing repeated starting and stopping of individual permanent magnet turbogenerators with hysterisis bands, rate limiting, and power setpoint integration.

19. The method of commanding and controlling the operation of a plurality of permanent magnet turbogenerators of claim 16 wherein said sequencing step includes limiting start attempts of a failed permanent magnet turbogenerator with a fault counter.

20. The method of commanding and controlling the operation of a plurality of permanent magnet turbogenerators of claim 16 wherein said sequencing step includes balancing the time of operation of each individual permanent magnet turbogenerator.

21. The method of commanding and controlling the operation of a plurality of permanent magnet turbogenerators of claim 16 wherein said sequencing step includes running an individual permanent magnet turbogenerator in an idle state to optimize transient response.

22. The method of commanding and controlling the operation of a plurality of permanent magnet turbogenerators of claim 16 wherein said sequencing step includes regulating the load output of each individual permanent magnet turbogenerator to maximize efficiency of the system.

23. The method of commanding and controlling the operation of a plurality of permanent magnet turbogenerators of claim 16 wherein said sequencing step includes operating the load output of all permanent magnet turbogenerators, except for the last to start permanent magnet turbogenerator, at maximum output, and regulating the last to start permanent magnet turbogenerator to maintain the power demand setpoint.

* * * * *